United States Patent
Bohlen et al.

(10) Patent No.: US 6,695,349 B2
(45) Date of Patent: Feb. 24, 2004

(54) POSITIONAL ADJUSTMENT APPARATUS FOR A STEERING COLUMN

(75) Inventors: Jens Bohlen, Reppenstedt (DE); Christian Born, Hamburg (DE); Wolfgang Schuliers, Buchholz (DE)

(73) Assignee: DaimlerChrysler AG, Stuttgart (DE)

( * ) Notice: Subject to any disclaimer, the term of this patent is extended or adjusted under 35 U.S.C. 154(b) by 116 days.

(21) Appl. No.: 09/930,490

(22) Filed: Aug. 16, 2001

(65) Prior Publication Data

US 2002/0027355 A1 Mar. 7, 2002

(30) Foreign Application Priority Data

Aug. 16, 2000 (DE) .......................... 100 39 794

(51) Int. Cl.[7] .............................................. B62D 1/18
(52) U.S. Cl. ........................................ 280/775; 74/493
(58) Field of Search ............................. 280/775; 74/493

(56) References Cited

U.S. PATENT DOCUMENTS

| | | | | |
|---|---|---|---|---|
| 3,342,080 A | * | 9/1967 | Cantleberry | 74/493 |
| 3,799,569 A | * | 3/1974 | Baker | 280/775 |
| 4,041,796 A | * | 8/1977 | Shishido | 74/493 |
| 4,649,769 A | * | 3/1987 | Venable | 74/493 |
| 4,656,888 A | * | 4/1987 | Schmitz | 74/493 |
| 4,793,204 A | * | 12/1988 | Kubasiak | 74/493 |
| 4,900,059 A | * | 2/1990 | Kinoshita et al. | 280/775 |
| 5,199,319 A | * | 4/1993 | Fujiu | 74/493 |
| 5,213,004 A | | 5/1993 | Hoblingre | 74/493 |
| 5,527,068 A | * | 6/1996 | Schneider | 280/775 |
| 5,596,907 A | * | 1/1997 | Barton | 74/493 |
| 5,730,465 A | | 3/1998 | Barton et al. | 280/775 |
| 5,787,759 A | | 8/1998 | Olgren | 74/493 |
| 5,813,289 A | * | 9/1998 | Renick et al. | 74/493 |
| 5,979,265 A | * | 11/1999 | Kim et al. | 74/493 |
| 5,988,679 A | * | 11/1999 | Schelling et al. | 280/775 |
| 6,237,439 B1 | * | 5/2001 | Weber et al. | 74/493 |
| 6,244,128 B1 | * | 6/2001 | Spencer et al. | 74/493 |
| 6,419,269 B1 | * | 7/2002 | Manwaring et al. | 280/775 |
| 6,467,807 B2 | * | 10/2002 | Ikeda et al. | 280/775 |

FOREIGN PATENT DOCUMENTS

| | | |
|---|---|---|
| DE | 19507900 | 6/1996 |
| DE | 19805289 | 8/1998 |
| EP | 0493181 | 3/1994 |
| GB | 2273338 | 6/1994 |
| JP | 5195931 | 8/1993 |
| JP | 6219283 | 8/1994 |
| WO | WO9710136 | 3/1997 |

OTHER PUBLICATIONS

Japanese Office Action.

* cited by examiner

Primary Examiner—Paul N. Dickson
Assistant Examiner—Laura B. Rosenberg
(74) Attorney, Agent, or Firm—Crowell & Moring LLP

(57) ABSTRACT

A positional adjustment apparatus is provided for a steering column of a motor vehicle. A tubular jacket is fixed on two rails disposed substantially opposite one another, the rails extending in an axial direction of the tubular jacket and having slots extending in the axial direction for longitudinal adjustment of the steering column. Clamping bolts are provided that are guided through the slots in the rails and extend substantially in a radial direction away from the tubular jacket. At least one clamping bolt passes through a rail for vertical adjustment. Longitudinal and vertical adjustments are secured and released by means of an operating lever. The securing and releasing of the longitudinal and vertical adjustments takes place via a cam disc actuatable by the operating lever.

17 Claims, 5 Drawing Sheets

_US 6,695,349 B2_

POSITIONAL ADJUSTMENT APPARATUS FOR A STEERING COLUMN

BACKGROUND AND SUMMARY OF THE INVENTION

This application claims the priority of German Patent Document No. 10039794.8, filed Aug. 16, 2000, the disclosure of which is expressly incorporated by reference herein.

The present invention relates to a positional adjustment apparatus for a steering column, especially of a motor vehicle. Preferred embodiments relate to a positional adjustment apparatus for a steering column for a motor vehicle, having a tubular jacket fixed on two rails disposed substantially opposite one another, the rails extending in an axial direction of the tubular jacket and having slots extending in the axial direction for longitudinal adjustment of the steering column, and clamping bolts being provided that are guided through the slots in the rails and extend substantially in a radial direction away from the tubular jacket, at least one clamping bolt passing through a rail for vertical adjustment, and it being possible for the longitudinal and vertical adjustments to be secured and released by an operating lever.

A motor vehicle steering column customarily comprises a column jacket, a steering shaft which is rotatably supported on the column jacket, and a steering wheel affixed to the steering shaft. If the column jacket can be swung upwards and downwards to adjust the vertical position of the steering wheel, the steering column is described as rake-adjustable. If, however, the length of the column jacket can be changed in order thus to adjust the horizontal position of the steering wheel, the steering column is described as telescopically adjustable.

Positional adjustment apparatus for rake-adjustable and/or telescopic steering columns are known from industry use in which a pair of vertical sides of a stationary support are clamped by a lift-actuated screw or by a lifted-actuated twist cam on the column jacket in order to secure, by friction, the position of the column jacket relative to the vehicle bodywork.

German Published Patent Application DE 198 05 289 (corresponding U.S. Pat. No. 5,787,759) has also disclosed a rake-adjustable and telescopic motor vehicle steering column having a column jacket consisting of an upper and a lower column jacket, each of tubular shape, the lower column jacket overlapping the upper telescopically. The column jacket is vertically pivotable on the bodywork in order to adjust the vertical position of the steering wheel. Similarly, the upper column jacket can be adjusted horizontally relative to the lower. A positional adjustment apparatus between the upper column jacket and the bodywork secures the horizontal and vertical positions of the upper steering column and hence the horizontal and vertical positions of the steering wheel. An adjustment shaft of the positional adjustment apparatus extends through vertical and horizontal slots respectively above and below the column jacket, as a result of which a rake-adjustable and telescopically adjustable steering column is provided. If the adjustment lever of this adjustment apparatus is in its unlocked position, the column jacket can be adjusted freely both vertically and horizontally.

It has proved to be a disadvantage of this configuration of positional adjustment apparatus that the adjustment shaft is always above or below the column jacket, and therefore requires a great deal of vertical structural space.

A further position lock for an adjustable motor vehicle steering column disclosed by European Patent Document EP 0 493 181 D1 (corresponding U.S. Pat. No. 5,213,004) suffers from the same disadvantage, a bolt guided over the tubular jacket again being provided for the position lock and requiring a great deal of additional structural space.

A clamping apparatus for an adjustable column which requires less structural space, especially vertically, is proposed in German Patent DE 195 07 0900. This patent describes a clamping apparatus in which a tubular housing, adjustable in the direction of its longitudinal axis, can be fixedly clamped between two holders fixed in the bodywork by a clamping mechanism having an axially tensionable clamping bolt passing through the two holders transversely to the longitudinal axis of the tubular housing. The tubular housing receives a steering shaft, the clamping bolt enclosing in an annular manner the steering shaft disposed in the tubular housing and being disposed with its longitudinal axis in the region of the cross section of the tubular housing.

With such a clamping apparatus, however, it has proved to be a disadvantage that the clamping acts directly on the tubular jacket, which imposes very high requirement in respect of the design of the tubular jacket in order for this not to be adversely affected in the region of this clamping.

An adjustable motor vehicle steering column clamping system which solves this problem is known, for example from PCT application publication WO 97/10136 (corresponding U.S. Pat. No. 5,730,465). In this case an adjustable motor vehicle steering column clamping mechanism for adjusting a steering column is described which has a steering column bearing block with two flanks extending over each side of the outer steering column; each flank containing a slot in order to permit vertical adjustment. Such a configuration requires relatively little structural space in the vertical direction, as the bolts are guided away to the side of the tubular jacket and do not run above or below the tubular jacket.

The releasing and securing of the clamping system in this case takes place by means of a lever, which is connected to the two bolts guided away to the side of the tubular jacket. Each of the bolts in this case is provided with a left-hand and a right-hand thread, so that the threads are of multiple-start form. Fixed on these threads are parts of the clamping mechanism actuating lever, which extend in such a way that the two flanks clamp around the two sides of the outer jacket. The lateral parts of the actuating lever are secured by thread connected to the bolt for clamping purposes, each lateral part of the actuating lever comprising an inner cone that is connected to a butterfly nut screwed onto the bolt. When the actuating lever is twisted, the butterfly nuts on the bolts twist in opposite directions on the thread. In this way the lateral parts of the actuating lever can be moved relative to one another, in order thus to move the butterfly nuts to clamp the two supports together and thus effect the clamping of the steering column. If the actuating lever is twisted in the opposite direction of rotation, the two lateral parts are moved in their opposite direction in order to release the two supports and permit adjustment of the steering device.

It has proved, however, to be a disadvantage of this type of configuration that the actuating lever, during securing and releasing of the connection, results in relatively pronounced expansion and compression of the lateral flanks, which can bring about fatigue in the material. In addition, the provision of the bolts with a multiple-start thread requires a relatively substantial construction effort and is thus also very cost-intensive.

It is therefore an object of the present invention to provide a positional adjustment apparatus for a steering column in which, by relatively simple means, it is possible to secure and release the longitudinal and vertical adjustments of a steering column.

This object is achieved according to certain preferred embodiments of the invention with a positional adjustment apparatus for a steering column of the type referred to initially, wherein securing and releasing of the longitudinal and vertical adjustments is implemented via a cam disc actuatable by the operating lever.

With such a positional adjustment apparatus according to the invention for a steering column, it is possible to provide a simple and strong clamping system in a very shallow structural space, and it has proved particularly advantageous that, as a result of the use of a cam disc actuated by means of the operating lever, a defined stroke for the adjustment of the steering column is provided.

As a result a defined positioning of the actuating or operating lever is provided, in which adjustment is possible in one position whereas in the other predetermined position jamming takes place.

"Cam disc" is here understood as meaning, in each case, a disc having a profile which allows play between adjacent structural elements in a first position of the disc and produces a clamping effect, for example as a result of a raised portion, in a second position.

It has proved particularly advantageous according to certain preferred embodiments of the invention if separate cam discs are provided for longitudinal and for vertical adjustment, and the operating lever actuates a further cam disc mounted centrally relative to these cam discs and interacting therewith. With such a configuration, it is possible to achieve a situation wherein, as a result of different positioning of the actuating lever, a separate stroke can be provided for the two cam discs and hence vertical and longitudinal adjustment can take place separately.

The actuating lever itself here can, in either system, always be guided in a defined manner on the running surfaces of the cam discs.

For better guidance of the clamping bolt, provision may be made for a sleeve to be disposed on the clamping bolt and comprising a disc fixedly connected to the sleeve between a rail and a holder adjacent thereto. This is particularly advantageous if, according to certain preferred embodiments of the present invention, the operating lever for operating the positional adjustment apparatus is also moved in the course of the vertical adjustment movement only, not the longitudinal adjustment, and the various clamping elements are loosely disposed in sequence on the clamping bolt. The sleeve is able reliably to prevent the friction between the clamping bolt and the rails during an adjustment resulting in canting of the clamping bolt. In the case of vertical adjustment movements, the disc can slide along the holder together with the clamping bolt, but not cant. Thus the operating lever is cleanly guided and the risk of functional problems is effectively countered.

If, according to certain preferred embodiments of the invention, the positional adjustment apparatus is to be especially crashproof, but nevertheless to take up as little structural space as possible, the securing of the clamping bolts on at least one side of the tubular jacket can be provided by positive fitting, for example by means of a toothing, while on the other side clamping takes place by friction fitting. As a result of the positive-fitting clamping system, such a design is crashproof, while the friction-fitting permits an economy of structural space.

Further advantages and developments of the invention are apparent from the patent claims, the drawing and the description that follows, in which examples of embodiments of the invention are described in detail with reference to the drawings.

Other objects, advantages and novel features of the present invention will become apparent from the following detailed description of the invention when considered in conjunction with the accompanying drawings.

DETAILED DESCRIPTION OF THE DRAWINGS

Figure 1:
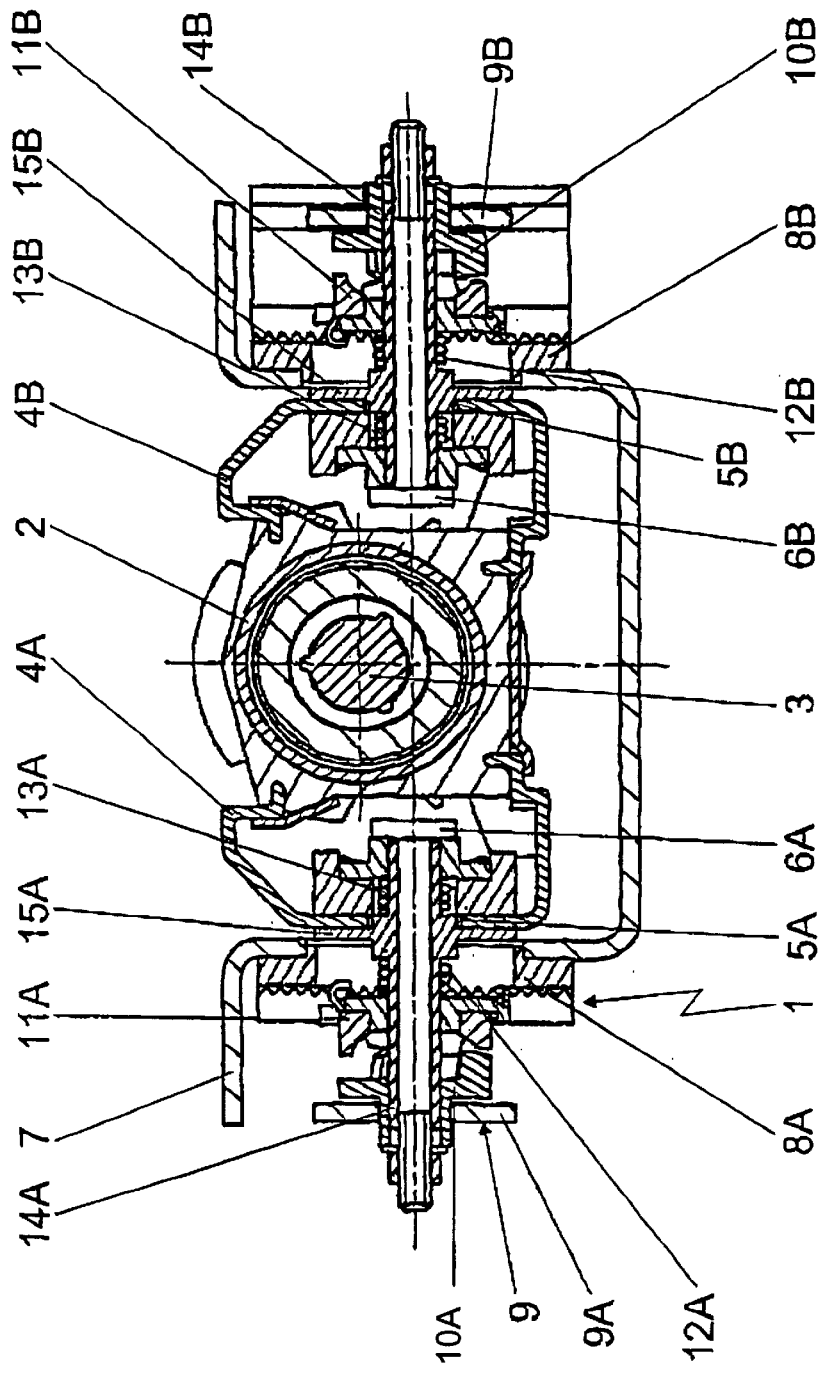
FIG. 1 shows a diagrammatic section through a steering column having a positional adjustment apparatus constructed according to a first preferred embodiment of the invention.

FIG. 1 shows a section through a steering column at the level of a positional adjustment apparatus 1. As is customary, the steering column is so designed that it is formed substantially by a steering shaft 3 housed in a tubular jacket 2.

As can be seen in FIG. 1, the tubular jacket 2 need not necessarily be a completely tubular component, but, in particular, the outer contour may be of different shapes depending on the configuration and manner in which it is secured on the motor vehicle.

The tubular jacket 2 is fixed to two rails 4A and 4B lying substantially opposite one another. These rails 4A, 4B extend substantially in the axial direction of the tubular jacket 2 and are in turn guided for longitudinal adjustment of the steering column. For this purpose, slots 5A, 5B, each extending in the axial direction, are provided in the respective rails 4A, 4B.

In addition, clamping bolts 6A, 6B are guided in the respective slots 5A, 5B of the rails 4A, 4B and extend substantially in a radial direction away from the tubular jacket 2. Furthermore, the clamping bolts 6A, 6B pass through a holder 7, which serves to secure them on a component solidly fixed to the motor vehicle.

As can be seen in FIG. 1, each of the two clamping bolts 6A, 6B here passes through a further rail, 8A and 8B respectively, articulated on the holder 7 for vertical adjustment. The securing and releasing of the longitudinal and vertical adjustments is provided by means of an operating lever 9, which is shown in FIG. 1 in a section at the point of articulation on the two clamping bolts 6A, 6B, and splits in the region of the articulation into two legs 9A, 9B engaging around the tubular jacket 2 and the rails 4A, 4B.

This operating lever 9 is disposed with each of its legs 9A, 9B on a running surface of a cam disc, 10A and 10B respectively, which in turn are in connection with a further cam disc 11A and 11B respectively. If the operating lever 9 is now actuated, the cam discs 10A, 11A and 10B, 11B respectively are so adjusted relative to one another that either a play is released between the cam discs or the cam discs 10A, 11A and 10B, 11B respectively exhibit no play relative to one another and the positional adjustment apparatus 1 is therefore secured.

If the cam discs 10A, 11A, and 10B, 11B respectively are in their position that releases play, the vertical and/or longitudinal adjustment of the steering column can take place.

As can further be seen further be seen from FIG. 1, the engagement and releasing of the clamping system for the vertical and longitudinal adjustments takes place substantially with positive fitting, for example by means of a toothing.

If the cam discs 10A, 11A and 10B, 11B respectively are in their position involving play, the reciprocally engaging teeth of the vertical adjustment are rapidly released from one another as a result of the fact that a spring 12A and 12B respectively is provided on each side, this counteracting the reciprocal engagement of the teeth and thus, as soon as the cam discs 10A, 11A and 10B, 11B respectively exhibit play, bring the teeth out of engagement.

A corresponding spring 13A, 13B may also be provided for the positive connection for longitudinal adjustment in accordance with the embodiment shown, in order thus to permit an easier adjustment of the length of the steering column as well.

If an adjustment of the height or length of the steering column now takes place, the clamping bolts 6A, 6B are guided by the operating lever 9. The operating lever 9, in the positional adjustment apparatus 1 according to the invention, following the vertical adjustment but not the longitudinal adjustment of the steering column.

In order to ensure that the operating forces introduced during the adjustment of the height and/or length do not result in canting of the clamping bolts 6A, 6B or of the individual parts disposed in succession on the clamping bolts 6A and 6B relative to one another or obstruct the reciprocal engagement of the toothed segments, a sleeve 14A and 14B respectively is provided on each of the clamping bolts 6A and 6B, the sleeves 14A and 14B each being fixedly connected to a large disc 15A and 15B respectively. This disc 15A and 15B is disposed on each side between the holder 7 and the respective rail 4A, 4B for longitudinal adjustment.

If now vertical adjustment takes place, the disc 15A or 15B can slide together with the clamping bolt 6A or 6B along the holder 7, but cannot cant. As a result, the operating lever 9 can be cleanly guided and functional problems during the adjustment of the steering column can be avoided.

Figure 2:
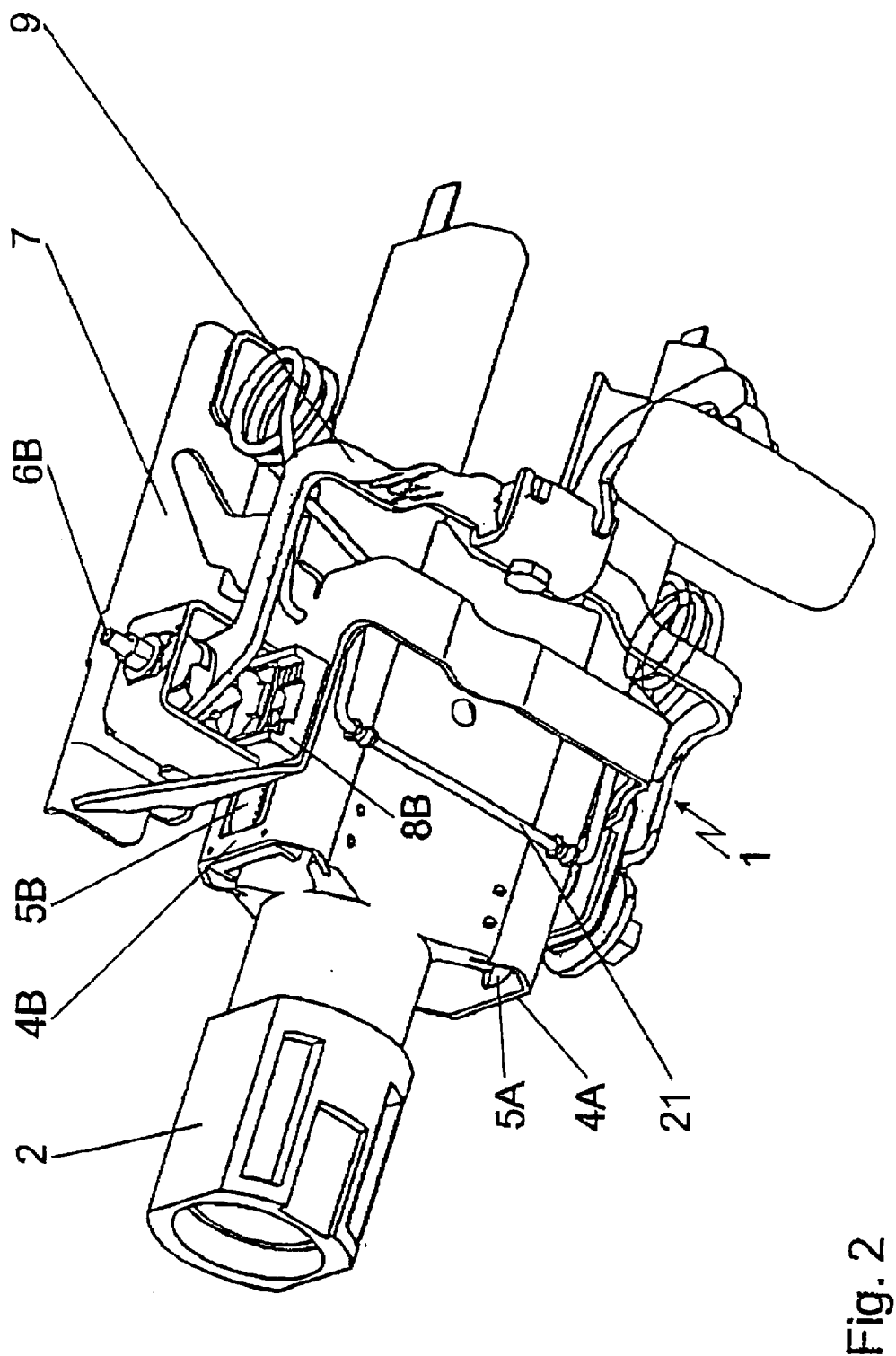
FIG. 2 shows a perspective view of a section of a tubular jacket having a positional adjustment apparatus according to a second preferred embodiment of the invention.

A further preferred embodiment of the invention is shown in FIG. 2, a perspective view here being provided of a positional adjustment apparatus 1 on a tubular jacket 2. For reasons of clarity, components performing the same functions are designated by the same reference numbers as in FIG. 1.

Figure 3:
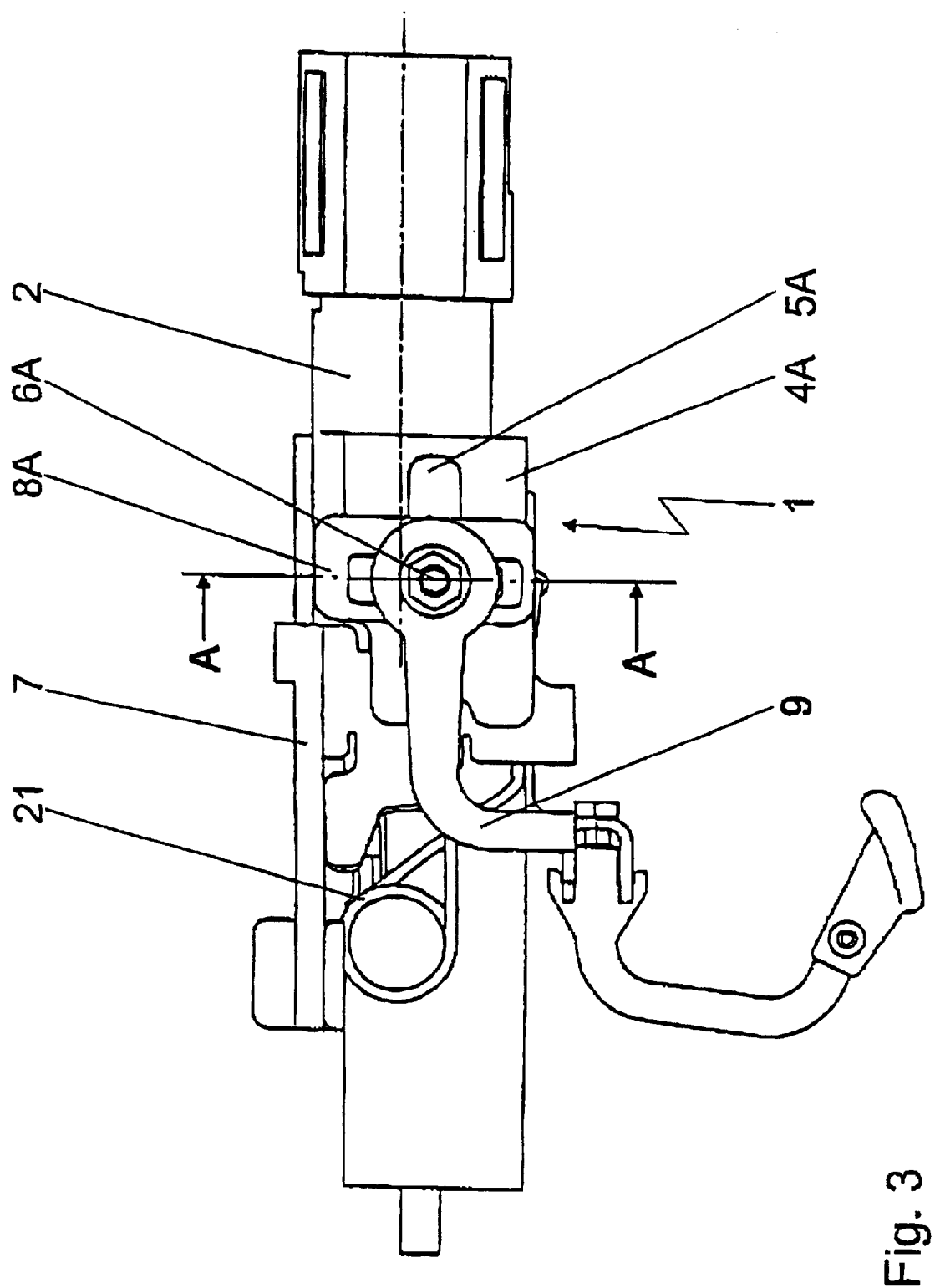
FIG. 3 shows a lateral view of the positional adjustment apparatus shown in FIG. 2.
Figure 4:
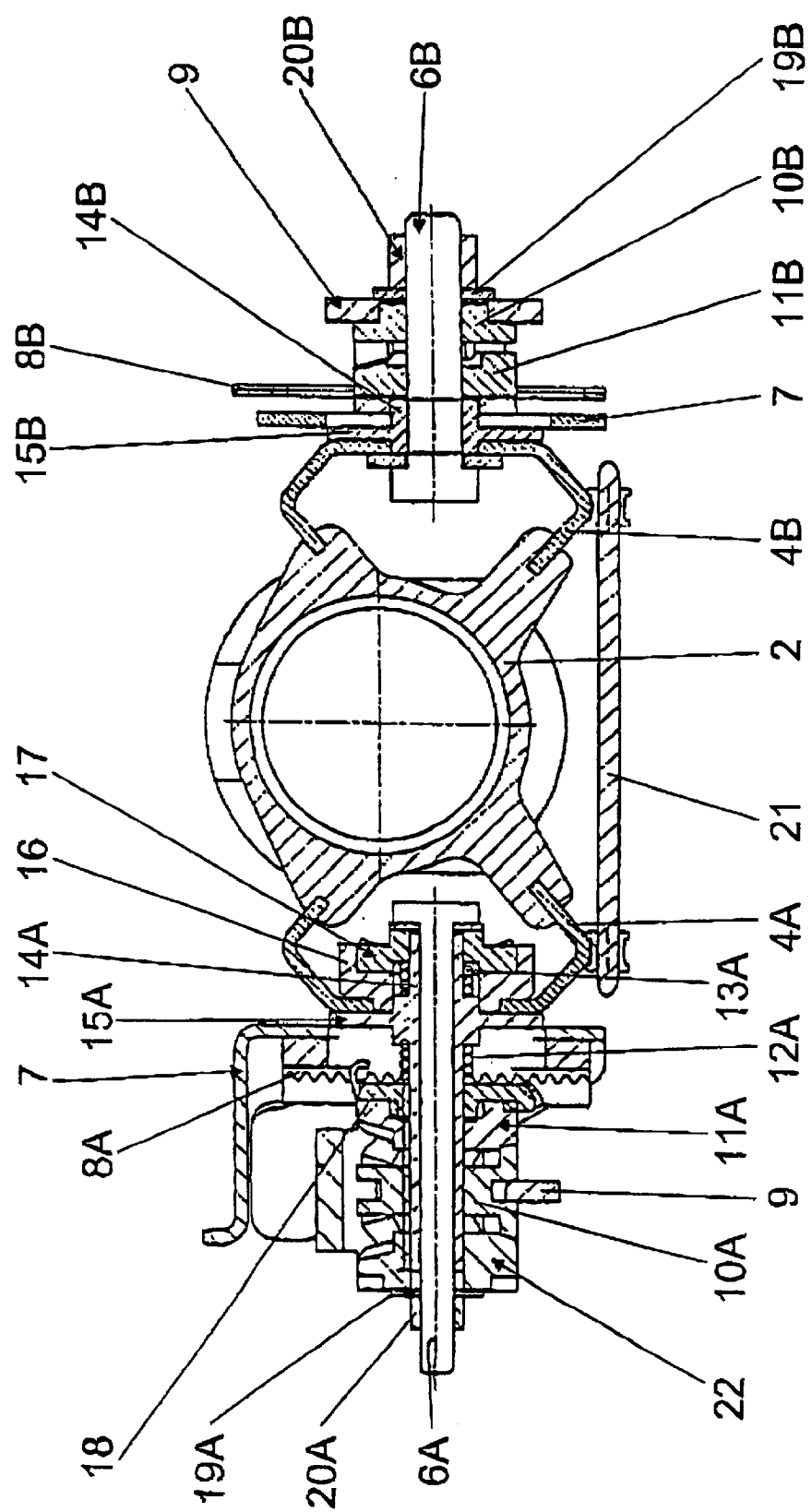
FIG. 4 shows a section along the line A—A in FIG. 3.
Figure 5:
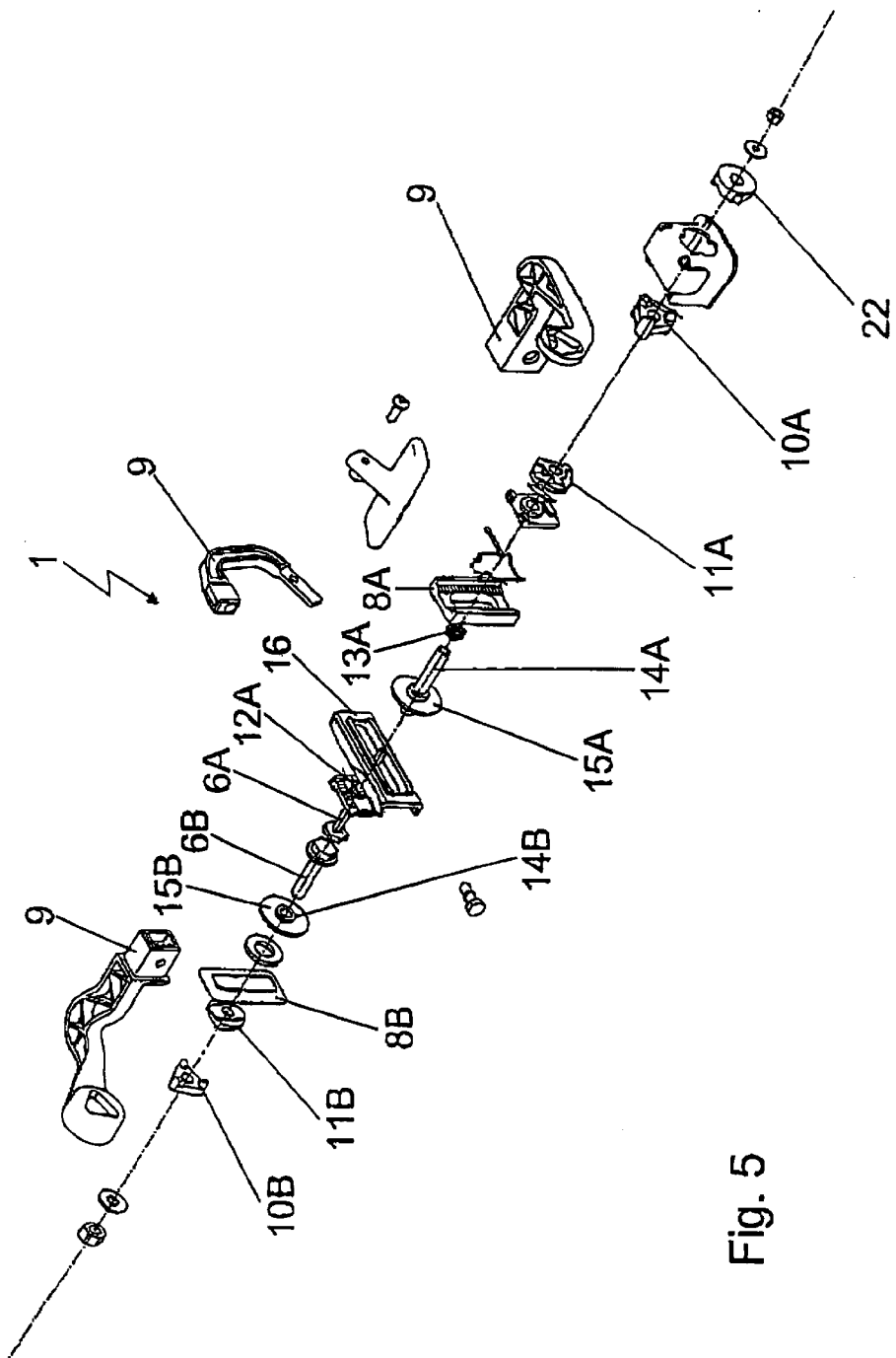
FIG. 5 shows an exploded view of the parts disposed on the clamping bolt in accordance with the second preferred embodiment shown in FIG. 2 and FIG. 4.

FIGS. 3 to 5 likewise show the positional adjustment apparatus 1 in the embodiment shown in FIG. 2, but in each case in a different view.

The embodiment shown in FIGS. 2 to 5, unlike the embodiment shown in FIG. 1, is a positioning device not of symmetrical shape but of asymmetrical shape. The asymmetry is achieved here, in particular, in that in order to lock the longitudinal and/or vertical adjustment, inter alia, the rails 4A, 4B, 8A, 8B provided for that purpose are clamped with positive fitting by the associated clamping bolts 6A and 6B, respectively, on one side of the tubular jacket 2 by corresponding toothed sections and on the other side of the bolt the longitudinal and vertical adjustments are provided by frictional clamping.

Such an embodiment has the advantage that the stroke is substantially reduced by comparison with an embodiment having two positive-fitting clamping systems, such as that shown in FIG. 1, as a result of which even more structural space can be saved. Nevertheless, the unilateral positive-fitting clamping system does provide secure clamping. In addition, the combination of a positive-fitting clamping system and a frictional clamping system has the advantage that the positive-fitting clamping system on the one side with the low prestress ensures relatively high crashproof properties while the frictional clamping system on the other side has high freedom from play and from vibration, which results in a relatively quiet guiding of the steering tube and hence, ultimately, of the steering wheel.

In FIG. 4, it is possible to see the arrangement of the individual components of the positioning apparatus, in particular, on the clamping bolts 6A, 6B. If the positive-fitting clamping system of the tubular jacket 2 on one side, in a direction leading away from the tubular jacket 2, is now observed, it can be seen that the clamping bolt 6A is guided through the slot 5A in the rail 4A, the rail 4A for its part being provided with a slide rail 16 which, on its side facing the tubular jacket 2, is provided with toothed segments, as can be seen in particular in FIG. 5. Provided here on the clamping bolt 6A is a slide ring 17 which is likewise provided with toothed segments that enter into engagement with the toothed segments of the slide rail 16 for the longitudinal adjustment of the tubular jacket 2.

Pushed onto the clamping bolt 6A is a sleeve 14A which has a radially extending disc 15A in the region between the rail 4A and the support 7.

Provided on the support 7A, in the direction leading away from the tubular jacket 2, is a slide rail 8A for vertical adjustment, which is provided on its side remote from the tubular jacket 2 with toothed segments. Disposed opposite this slide rail 8A is a slide ring 18 located on the clamping bolt 6A and provided on the side facing the slide rail 8A with toothed segments in order to enter into engagement with the slide rail 8A itself.

Disposed in the direction leading away from the tubular jacket 2 are three cam discs 11A, 10A and 22, the middle cam disc 10A being in engagement with the lever 9 which, in operating, effects a rotation of the cam disc 10A. The arrangement on the clamping bolt 6A is completed by a washer 19 and a hexagon nut 20A.

The cam discs 10A, 11A, 22 are so disposed that in the closed position or clamping position of the operating lever 9 no play exists between the cam discs 10A, 11A and 22, whereas in an adjustment position of the operating lever 9 play does exist. In such an adjustment position, the springs 12A, 13A act so that the slide rail 16 and the rail 4A are moved apart by their slide rings 17 and 18 respectively, so that their toothed segments are no longer in engagement with one another.

On the other side of the tubular jacket 2, where a frictional-fitting clamping mechanism is provided, which permits a narrow design of the positional adjustment apparatus 1, the clamping bolt 6B is guided through the rail 4B and then passes through the holder 7, which is likewise not symmetrical in form but is very narrow in shape on the side provided with frictional-fitting clamping, at least in the front region of the tubular jacket 2, and widens only towards the rear.

A sleeve 14B is again disposed on the clamping bolt 6B and is provided with a disc 15B which extends in the region between the rail 4B and the holder 7. The sleeve 14B is followed, in the direction leading away from the tubular jacket 2, by the cam disc 11B, which supports in a twistproof manner the rail 8B projecting radially over it for vertical adjustment. This is followed by the cam disc 11B, the outer one as viewed from the tubular jacket 2, which is in connection with the operating lever 9. Thereafter, in the same manner as on the other side, a washer 19B and a hexagon nut 20B are provided on the clamping bolt 6B.

The spring 21 serves to position the released tubular jacket in a floating manner.

The number and sequence of the cam discs can of course be different in other embodiments from the examples of embodiment shown. However, the person skilled in the art will always dispose the cam discs, however many of them are provided, in such a way that the operating lever 9 always makes it possible to achieve an open or closed position simultaneously at least for adjustment in one direction so that vertical and/or longitudinal adjustment always becomes possible.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. Positional adjustment apparatus for a steering column for a motor vehicle, having a tubular jacket fixed on two rails disposed substantially opposite one another, the rails extending in an axial direction of the tubular jacket and having slots extending in the axial direction for longitudinal adjustment of the steering column, and clamping bolts being provided that are guided through the slots in the rails and extend substantially in a radial direction away from the tubular jacket, at least one clamping bolt passing through a rail for vertical adjustment, and it being possible for the longitudinal and vertical adjustments to be secured and released by an operating lever, wherein securing and releasing of the longitudinal and vertical adjustments are separately implemented via a respective cam disc actuatable by the operating lever.

2. Positional adjustment apparatus according to claim 1, wherein the operating lever actuates a further cam disc mounted centrally relative to the respective mounted cam discs and interacting therewith.

3. Positional adjustment apparatus according to claim 2, wherein a sleeve fixedly connected to a disc is disposed between at least one of the rails and a holder adjacent thereto on the clamping bolt fixed to the vehicle.

4. Positional adjustment apparatus according to claim 2, wherein in order to lock the longitudinal and/or vertical adjustment at least the rails provided therefor can be jammed with positive fitting on at least one side of the tubular jacket by the at least one assigned clamping bolt.

5. Positional adjustment apparatus according to claim 4; wherein the clamping with positive fitting is at least partially formed by appropriate toothed sections.

6. Positional adjustment apparatus according to claim 2, wherein in order to lock the longitudinal and/or vertical adjustment, at least the rails provided therefore can be jammed with frictional fitting on at least one side of the tubular jacket by the at least one assigned clamping bolt.

7. Positional adjustment apparatus according to claim 1, wherein a sleeve fixedly connected to a disc is disposed between at least one of the rails and a holder adjacent thereto on the clamping bolt fixed to the vehicle.

8. Positional adjustment apparatus according to claim 7, wherein in order to lock the longitudinal and/or vertical adjustment at least the rails provided therefor can be jammed with positive fitting on at least one side of the tubular jacket by the at least one assigned clamping bolt.

9. Positional adjustment apparatus according to claim 8, wherein the clamping with positive fitting is at least partially formed by appropriate toothed sections.

10. Positional adjustment apparatus according to claim 7, wherein in order to lock the longitudinal and/or vertical adjustment, at least the rails provided therefore can be jammed with frictional fitting on at least one side of the tubular jacket by the at least one assigned clamping bolt.

11. Positional adjustment apparatus according to claim 1, wherein in order to lock the longitudinal and/or vertical adjustment at least the rails provided therefor can be jammed with positive fitting on at least one side of the tubular jacket by the at least one assigned clamping bolt.

12. Positional adjustment apparatus according to claim 11, wherein the clamping with positive fitting is at least partially formed by appropriate toothed sections.

13. Positional adjustment apparatus according to claim 12, wherein clamping with positive fitting is provided on one of the sides of the tubular jacket and clamping with frictional fitting is provided on the other side.

14. Positional adjustment apparatus according to claim 11, wherein clamping with positive fitting is provided on one of the sides of the tubular jacket and clamping with frictional fitting is provided on the other side.

15. Positional adjustment apparatus according to claim 1, wherein in order to lock the longitudinal and/or vertical adjustment, at least the rails provided therefore can be jammed with frictional fitting on at least one side of the tubular jacket by the at least one assigned clamping bolt.

16. Positional adjustment apparatus according to claim 15, wherein clamping with positive fitting is provided on one of the sides of the tubular jacket and clamping with frictional fitting is provided on the other side.

17. Positional adjustment apparatus according to claim 1, wherein clamping with positive fitting is provided on one of the sides of the tubular jacket and clamping with frictional fitting is provided on the other side.

\* \* \* \* \*